(12) United States Patent
Touze et al.

(10) Patent No.: US 12,479,170 B2
(45) Date of Patent: Nov. 25, 2025

(54) METHOD FOR MANUFACTURING A COMPOSITE BLADE FOR AN AIRCRAFT ENGINE

(71) Applicant: SAFRAN, Paris (FR)

(72) Inventors: Adrien Touze, Moissy-Cramayel (FR); Magali Mélanie Coulaud, Moissy-Cramayel (FR); Nicolas Pierre Lanfant, Moissy-Cramayel (FR); Matthieu Stackler, Moissy-Cramayel (FR)

(73) Assignee: SAFRAN, Paris (FR)

( * ) Notice: Subject to any disclaimer, the term of this patent is extended or adjusted under 35 U.S.C. 154(b) by 293 days.

(21) Appl. No.: 17/777,330

(22) PCT Filed: Nov. 25, 2020

(86) PCT No.: PCT/FR2020/052170
§ 371 (c)(1),
(2) Date: May 17, 2022

(87) PCT Pub. No.: WO2021/105612
PCT Pub. Date: Jun. 3, 2021

(65) Prior Publication Data
US 2022/0402218 A1    Dec. 22, 2022

(30) Foreign Application Priority Data

Nov. 29, 2019    (FR) ........................ 1913467

(51) Int. Cl.
*B29C 70/24*    (2006.01)
*B29C 70/00*    (2006.01)
(Continued)

(52) U.S. Cl.
CPC ............ *B29C 70/24* (2013.01); *B29C 70/003* (2021.05); *B29C 70/48* (2013.01);
(Continued)

(58) Field of Classification Search
CPC ....... B29C 70/24; B29C 70/003; B29C 70/48; B29C 70/68; B29C 70/885;
(Continued)

(56) References Cited

U.S. PATENT DOCUMENTS 5,248,116 A * 9/1993 Rauckhorst .......... B64D 15/166
244/134 A
6,086,138 A * 7/2000 Xu .............................. B60J 1/10
52/204.591

(Continued)

FOREIGN PATENT DOCUMENTS

| FR | 2956057 A1 | 8/2011 |
|----|------------|--------|
| FR | 3029134 A1 | 6/2016 |
| FR | 3051386 A1 | 11/2017 |

OTHER PUBLICATIONS

International Search Report mailed Mar. 2, 2021, issued in corresponding International Application No. PCT/FR2020/052170, filed Nov. 25, 2020, 2 pages.

(Continued)

*Primary Examiner* — Jacob T Minskey
*Assistant Examiner* — Caroline Beha
(74) *Attorney, Agent, or Firm* — Christensen O'Connor Johnson Kindness PLLC

(57) ABSTRACT

A process for manufacturing a blade made of composite material for a turbomachine is provided. The blade includes an airfoil having a pressure side and a suction side which extend from a leading edge to a trailing edge of the airfoil. The blade further includes a metal sheath that extends along the leading edge of the airfoil. The process includes the steps of: a) placing a preform, made by three-dimensionally weaving fibers, in a mold, a polymerizable adhesive being inserted between the sheath and the edge of the preform; and b) injecting polymerizable resin into the mold to impregnate the preform so as to form the airfoil after solidifying, (Continued)

wherein the resin is injected within a time interval during which the adhesive reaches a freezing point.

12 Claims, 4 Drawing Sheets

(51) Int. Cl.
    *B29C 70/48*     (2006.01)
    *B29K 105/00*     (2006.01)
    *B29K 105/10*     (2006.01)
    *B29L 31/08*     (2006.01)
    *B29K 63/00*     (2006.01)

(52) U.S. Cl.
    CPC .. *B29K 2063/00* (2013.01); *B29K 2105/0061* (2013.01); *B29K 2105/0097* (2013.01); *B29K 2105/101* (2013.01); *B29L 2031/082* (2013.01)

(58) Field of Classification Search
    CPC ........ B29K 2063/00; B29K 2105/0061; B29K 2105/0097; B29K 2105/101; B29L 2031/082; B29L 2031/08; B29D 99/0025; F05D 2220/36; F05D 2230/23; F05D 2230/40; F05D 2230/70; F05D 2230/72; F05D 2230/80; F05D 2240/303; F05D 2300/43; F05D 2300/6034; Y02T 50/60; F01D 5/147; F01D 5/282; F01D 5/288; F01D 5/005

See application file for complete search history.

(56) References Cited

U.S. PATENT DOCUMENTS

| | | | |
|---|---|---|---|
| 9,108,331 B2 | 8/2015 | Grosbois et al. | |
| 9,555,566 B2* | 1/2017 | Gani | B29C 45/1639 |
| 10,864,689 B2 | 12/2020 | Techer et al. | |
| 10,994,504 B2 | 5/2021 | Techer et al. | |
| 2007/0126142 A1* | 6/2007 | Zhou | B29C 70/523 |
| | | | 264/134 |
| 2011/0194941 A1* | 8/2011 | Parkin | F04D 29/023 |
| | | | 416/224 |
| 2016/0346963 A1* | 12/2016 | Yui | B29C 35/0288 |

OTHER PUBLICATIONS

Written Opinion of the International Searching Authority mailed Mar. 2, 2021, issued in corresponding International Application No. PCT/FR2020/052170, filed Nov. 25, 2020, 7 pages.

Solvay Composite Materials, "Technical Data Sheet FM 309-1 Film Adhesive," Oct. 10, 2017, <<https://www.solvay.com/en/product/fm-309-1>> retrieved from the Internet Jun. 25, 2020, 7 pages.

International Preliminary Report on Patentability mailed May 17, 2022, issued in corresponding International Application No. PCT/FR2020/052170, filed Nov. 25, 2020, 1 page.

* cited by examiner

[FIG.1]
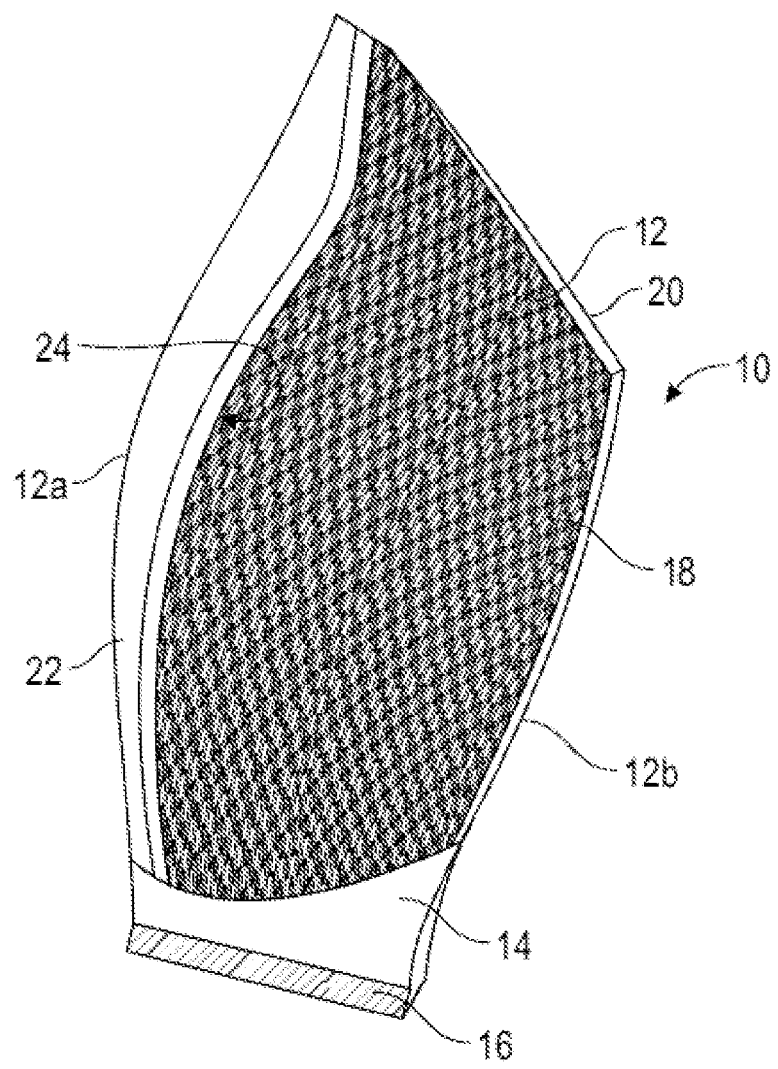

[FIG.2]
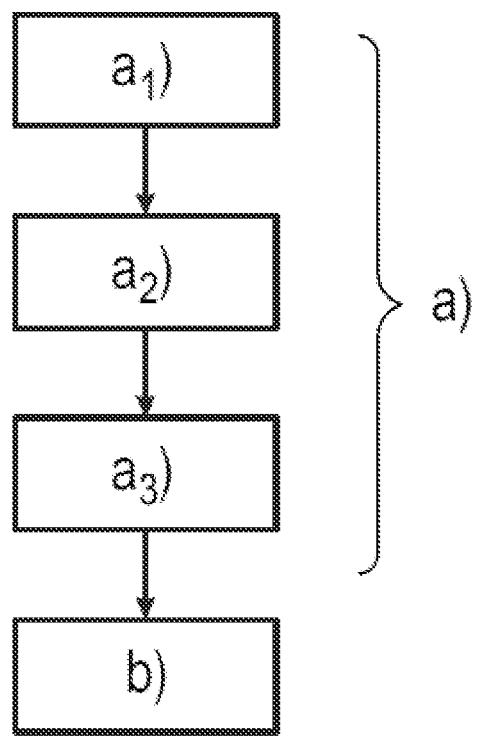

[FIG.3]
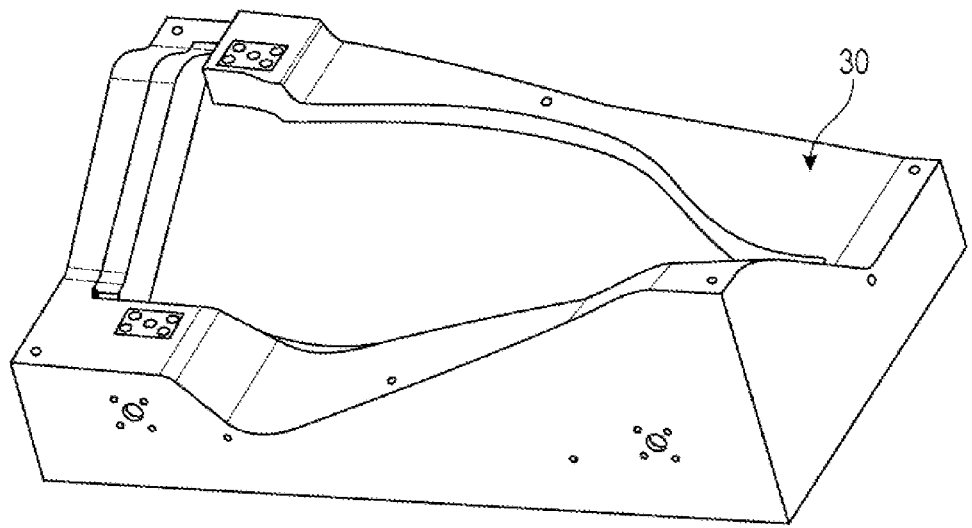

[FIG.4]
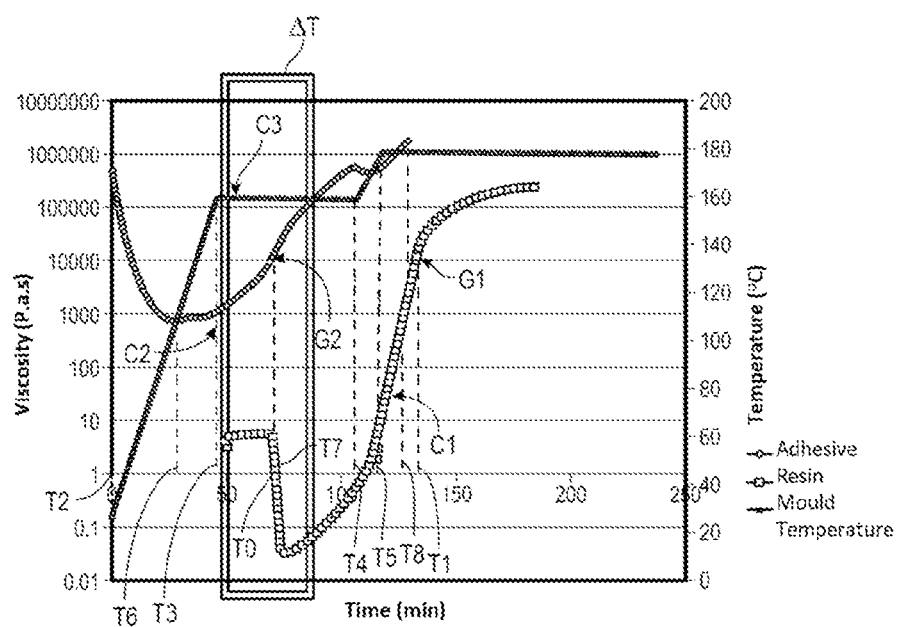

METHOD FOR MANUFACTURING A COMPOSITE BLADE FOR AN AIRCRAFT ENGINE

CROSS-REFERENCES TO RELATED APPLICATIONS

This application is a National Stage of International Application No. PCT/FR2020/052170, filed Nov. 25, 2020, which claims priority to French Patent Application No. 1913467, filed Nov. 29, 2019, the entire disclosures of which are hereby incorporated by reference in their entirety.

TECHNICAL FIELD OF THE DISCLOSURE

Embodiments of the present disclosure relate to a method for manufacturing a blade made of composite material for an aircraft turbomachine.

BACKGROUND

The prior art includes, in particular, the documents FR-A1-2 956 057, FR-A1-3 029 134 and FR-A1-3 051 386.

The use of composite materials is advantageous in the aeronautical industry, in particular, because these materials have interesting mechanical performances for relatively low masses.

A method for manufacturing a composite part for the aeronautics industry, which is well known to the person skilled in the art, is the RTM molding method, the initials of which refer to Resin Transfer Molding.

This is a method for producing a part made of a composite material based on resin-impregnated fibers. Such a method is used, for example, to manufacture a fan blade and comprises several successive stages.

First, the weaving of fibers is carried out to obtain a three-dimensional preform blank, then the blank is cut to obtain a preform having substantially the shape of the blade to be obtained. This preform is then placed in an injection mold, which is closed. Then resin is injected in a liquid state by maintaining a pressure on the injected resin while the part is polymerized by heating.

The resins used are very fluid resins that are able to penetrate the fibers of the preform, even when injected under reduced pressure. During the polymerization method, under the effect of the heat, the injected resin passes successively from the liquid state to the gelled state and finally to the solid state.

To manufacture a blade, for example for a turbomachine fan, a preform is made by weaving and then impregnated with resin to form a vane. This vane comprises a pressure side and a suction side which extend from a leading edge to a trailing edge of the vane.

The composite material of the vane is relatively fragile, and in particular sensitive to the impact, and it is known to be protected by means of a metal shield that is attached and fixed to the leading edge of the vane.

The shield can be attached to the vane in two ways. The first way is to glue the shield to the vane, after the polymerization of the resin. The glue is then in the form of a paste.

Another way is to fix the shield by co-molding with the fibrous preform. The preform is placed in the mold and the shield is positioned on the edge of the preform intended to form the leading edge of the vane. The injected resin impregnates the preform and comes into contact with the shield to ensure that it is secured to the vane after polymerization and curing.

SUMMARY

The present disclosure concerns an improvement to this second technology in which the shield and the preform undergo co-molding.

The Applicant has sought to optimize the attachment of a shield by combining the two existing technologies and thus using an adhesive in addition to co-molding the shield with the vane. The adhesive is inserted between the shield and the leading edge of the vane.

In this case, the resin and the adhesive are polymerizable. The adhesive has different rheological properties than the resin. The adhesive usually starts to cure at a lower temperature than the resin. This temperature is reached when the mold is heated to the high temperature at which the resin is injected. An adhesive whose polymerization is too advanced at the time of resin injection does not allow for an effective co-bonding between resin and adhesive and reduces the mechanical strength of the shield on the vane.

The disclosure provides a simple, effective and economical solution to ensure correct positioning and optimal mechanical strength of the shield on the blade.

The disclosure proposes a method for manufacturing a blade made of composite material for a turbomachine, in particular for an aircraft, this blade comprising a vane comprising pressure side and a suction side which extend from a leading edge to a trailing edge of the vane, the blade also comprising a metal shield extending along the leading edge of the vane, the method comprising the steps of:

a) disposing a preform made by three-dimensionally weaving fibers in a mold, the shield being positioned on an edge of the preform intended to form the leading edge of the vane, and a polymerizable adhesive being interposed between the shield and the edge of the preform, b) injecting polymerizable resin into the mold to impregnate the preform to form the vane after solidification, characterized in that the resin is injected in step b) within a time interval during which the adhesive reaches a gel point.

The disclosure thus proposes to secure the shield to the vane by co-molding and by an adhesive film. The adhesive film is interposed between the shield and the edge of the preform and is intended to improve and maintain the position of the shield on the edge of the preform, and also to improve the hold and tear resistance of the shield with respect to the vane. It is thus understood that, during the injection of resin into the manufacturing mold of the vane, this resin will impregnate the preform and will also come into contact with the film or even the shield, thus ensuring optimal attachment of the shield to the blade.

The disclosure also proposes a resin injection cycle adapted to the presence of the adhesive. The objective is to inject the resin during a time interval during which the viscosity of the adhesive allows a satisfactory co-bonding to be obtained. The resin is injected before the adhesive becomes too viscous, which would prevent a good co-bonding between the products. This is achieved by injecting the resin within a time interval during which the adhesive reaches a gel point.

A gel is formed by two media dispersed in each other: the first medium is called "solid" or "gel" and is made up of long molecules connected to each other by cross-linking points, to form a three-dimensional (3D) network. The second, on the contrary, is a liquid medium called "solvent" or "sol" and consists of independent molecules.

The change of state of a system from a single phase, the sol, to a sol-gel biphase is called sol-gel transition. Generally, the state of the gelation method is characterized by its degree of advancement p, where p varies between zero and one between the beginning and end of the polymerization method. At the gel point or "gel point", the value of the degree of advancement is pc. The "gel point" is the instant of abrupt change in the viscosity of the medium. Thus, for $0<p<pc$, the reaction bath is a liquid with a viscosity $\eta$ that increases to pc. For $1 \geq p > pc$, it is an elastic body whose shear modulus $\mu$ grows. At the point pc, the gel is formed. However, polymerization continues and the viscosity increases. In the context of the present disclosure, it is the concept of gel point that is most important as well as the fact that one can no longer inject, nor compact once gelation (solid state) has occurred. The gel point is the passage from several 3D macromolecules to a single 3D macromolecule, the presence of solvent not having any impact on the viscosity (molecules independent of the 3D network).

The present disclosure thus proposes to adapt the timing and duration of injection of the resin according to the state of progress of the polymerization of the adhesive and in particular the variation of its viscosity. Injecting the resin for a period of time including the time at which the gel point of the adhesive is reached ensures a good co-bonding between the resin and the adhesive in particular.

The method according to the disclosure may comprise one or more of the following features, taken alone or in combination with each other:
- the adhesive is in the form of an adhesive film, in particular double-sided;
- the resin is injected in step b) within a time interval in the middle of which the adhesive reaches the gel point;
- the time interval starts at least 5 minutes, and preferably 10 minutes, before the adhesive reaches the gel point, and ends at least 5 minutes, and preferably 10 minutes, after the adhesive reaches the gel point;
- the resin starts to be injected when the adhesive reaches the gel point;
- the temperature of the mold is regulated so that it is kept constant during the time interval;
- the temperature of the mold is maintained at at least 160° C. during the time interval;
- the resin is an epoxy resin;
- the adhesive is an epoxy adhesive;
- the adhesive is the adhesive marketed by the Solvay company under the reference FM® 309-1.

DESCRIPTION OF THE DRAWINGS

Further features and advantages of the disclosure will become apparent from the detailed description that follows, for the understanding of which reference is made to the appended drawings in which:

FIG. 1 is a schematic perspective view of a composite aircraft turbomachine blade;

FIG. 2 is a block diagram showing the steps of a method according to the disclosure for manufacturing a blade such as that shown in FIG. 1;

FIG. 3 is a schematic perspective view of a mold in which a preform and a shield are intended to be arranged, and in which a resin is intended to be injected; and FIG. 4 is a graph representing both the evolution of the viscosity of the resin and of an adhesive as a function of time, as well as the evolution of the temperature as a function of time, during the manufacturing method.

DETAILED DESCRIPTION

Reference is first made to FIG. 1, which illustrates a composite material blade 10 for a turbomachine, the blade 10 being, for example, a fan blade.

The blade 10 comprises a vane 12 connected by a support 14 to a root 16 which has, for example, a dovetail shape and is shaped to be engaged in a complementarily shaped recess of a rotor disk, in order to retain the blade on this disk.

The vane 12 includes a leading edge 12a and a trailing edge 12b for gases flowing into the turbomachine. The vane 12 has a curved or even twisted aerodynamic profile and comprises a pressure side 18 and a suction side 20 extending between the leading edge 12a and trailing edge 12b.

The vane 12 is made from a fibrous preform obtained by three-dimensional weaving of fibers, for example carbon.

The leading edge 12a of the vane is reinforced and protected by a metal shield 22 that is attached to this leading edge 12a. The shield 22 is, for example, made of a nickel and cobalt based alloy.

In the present disclosure, this attachment is achieved on the one hand by co-molding the preform with the shield 22, and on the other hand by bonding the shield 22 by means of at least one adhesive 24, preferably in film form.

FIG. 2 is a flowchart illustrating steps in a method for manufacturing a composite blade 10 such as that shown in FIG. 1.

The method may include several steps, some of which are optional.

The first step a) of the method includes several sub-steps or operations. In a first operation a1) discussed above, a fibrous preform is made by weaving fibers. The resulting preform is raw and can undergo operations such as cutting or compression, for example.

In a further operation a2) of the method, one or more adhesive films 24 are prepared. This adhesive film 24 is intended to be interposed between the shield 22 and the preform, before injection of the resin into a mold 30 for manufacturing the blade, which is shown in FIG. 3.

This adhesive film 24 is, for example, a double-sided film, i.e., a film that is sticky on both sides. This film is thus coated or soaked on both sides with a glue, for example of the epoxy type. This is, for example, the adhesive marketed by the Solvay company under the reference FM® 309-1.

This adhesive film 24 has, for example, a thickness of between 0.1 mm and 0.2 mm. This film 24 can be in the form of a strip. It can thus have an elongated shape whose dimensions are a function of those of the shield 22.

The shield 22 is generally dihedral in shape and defines a V-shaped groove into which an edge of the preform is inserted.

The adhesive film 24 is preferably adhered to the shield 22 within the groove.

Another operation (a3)) of the method then consists in positioning the preform equipped with the film 24 and the shield 22 in the mold 30 (FIG. 3), which is then closed, for example, with a counter-mold.

The successive operations a1) to a3) represent a first step a) of the manufacturing method.

In a second step b) of the method, the resin is injected into the mold 30 and is intended to impregnate the preform and to come into contact with the film 24 and the shield 22. After polymerization and curing of the resin, the shield 22 is attached to the vane by means of the adhesive film 24 and the resin.

The blade 10 thus obtained, after polymerization of the resin, is advantageous in that its shield 22 is perfectly positioned and maintained on the vane 12.

FIG. 4 illustrates a feature of the disclosure relating to the time of injection of the resin into the mold.

FIG. 4 is a graph comprising three curves C1, C2 and C3.

The curve C1 represents the evolution of the viscosity of the resin over time. Curve C2 represents the evolution of the viscosity of the adhesive over time and curve C3 represents the evolution of the temperature of the mold 30 over time.

In practice, the curve C1 depends on the resin used. The resin is injected at a time T0 and undergoes a decrease in viscosity. The viscosity of the resin then increases due to polymerization and reaches a gel point G1 at T1. The resin is injected, for example, at a pressure of between 5 and 15 bars, and for a period of about 120 minutes.

The temperature of the mold 30 (curve C3) is regulated as a function of the resin so as to optimize its polymerization. The temperature increases progressively from a time T2 until it reaches a threshold at T3 at a temperature, here greater than or equal to 160° C., which corresponds to the polymerization temperature of the resin. This threshold is maintained until T4 and then the temperature is increased from T4 to T5 until a new threshold at a temperature greater than or equal to 180° C.

T3 occurs earlier than T0, i.e., the threshold at 160° C. is reached before the resin is injected into the mold. Furthermore, T4 and T5 occur before T1. The gel point G1 of the resin therefore occurs during the second temperature threshold.

The curve C2 depends on the adhesive used. The viscosity of the adhesive decreases from T2, i.e., from the beginning of the heating of the mold. The viscosity then increases from T6 onwards and continues to rise through a gel point G2 at T7. T7 is between T3 and T4. The vitrification V1 of the adhesive is reached at T8. T8 is here later than T5 and earlier than T1.

According to the disclosure, the resin is injected into the mold within a time interval ΔT around the gel point G2 of the adhesive. This time interval ΔT is represented in FIG. 4 by a rectangle delimited by a double line. It is thus understood that the resin is advantageously injected into the mold during this time lapse during which the viscosity of the adhesive is not too high. This ensures optimum co-bonding between the adhesive and the resin.

In the example shown, the times T0 and T7 coincide, i.e., the resin injection takes place or begins at the gel point G2 of the adhesive.

The invention claimed is:

1. A method for manufacturing a blade made of composite material for a turbomachine, said blade comprising a vane having a pressure side and a suction side which extend from a leading edge to a trailing edge of the vane, the blade further comprising a metal shield extending along the leading edge of the vane, the method comprising:

disposing a preform made by three-dimensionally weaving fibers in a mold, the shield being positioned on an edge of the preform to form the leading edge of the vane, and a polymerizable adhesive being interposed between the shield and the edge of the preform, said polymerizable adhesive having not reached a gel point of said polymerizable adhesive;

after the preform, the shield and the polymerizable adhesive interposed between the shield and the edge of the preform have been disposed into the mold, beginning injecting polymerizable resin into the mold before the polymerizable adhesive reaches a gel point of said polymerizable adhesive so that the polymerizable resin impregnates the preform to form the vane after solidification, and so that the polymerizable resin passes through the polymerizable adhesive to reach the shield, wherein the polymerizable resin is injected for a period of time during which said polymerizable adhesive reaches the gel point so that the injection of the polymerizable resin is stopped after said adhesive has reached the gel point.

2. The method according to claim 1, wherein the polymerizable adhesive is in the form of an adhesive film.

3. The method of claim 1, wherein said polymerizable adhesive reaches the gel point in the middle of the period of time.

4. The method according to claim 2, wherein the period of time starts at least five minutes before the polymerizable adhesive reaches the gel point, and ends at least five minutes after the polymerizable adhesive reaches the gel point.

5. The method according to claim 1, wherein the temperature of the mold is regulated so that it is kept constant during the period of time.

6. The method of claim 1, wherein the temperature of the mold is maintained at a temperature of at least 160° C. during the period of time.

7. The method of claim 1, wherein the polymerizable resin is an epoxy resin.

8. The method of claim 1, wherein the polymerizable adhesive is an epoxy adhesive.

9. A method for manufacturing a blade made of composite material for a turbomachine, said blade having a vane with a pressure side and a suction side which extend from a leading edge to a trailing edge of the vane, the blade further having a metal shield extending along the leading edge of the vane, the method comprising:

disposing a preform formed of a three-dimensional weave of fibers in a mold, the shield being positioned on an edge of the preform to form the leading edge of the vane, wherein a polymerizable adhesive is interposed between the shield and the edge of the preform, the polymerizable adhesive having a gel point;

injecting polymerizable resin into the mold to impregnate the preform to form the vane after solidification, wherein the polymerizable resin is injected over a period of a time during which the polymerizable adhesive reaches the gel point, and wherein the injection of polymerizable resin begins before the polymerizable adhesive reaches the gel point so that the injection of the polymerizable resin is stopped after said adhesive has reached the gel point.

10. A method for manufacturing a blade made of composite material for a turbomachine, said blade having a vane with a pressure side and a suction side which extend from a leading edge to a trailing edge of the vane, the blade further having a metal shield extending along the leading edge of the vane, the method comprising:

obtaining a preform made by a three-dimensionally weave of fibers in a mold;

positioning the shield on an edge of the preform to form the leading edge of the vane;

placing a polymerizable adhesive between the shield and the edge of the preform, the polymerizable adhesive having a gel point;

disposing the preform, the shield and the polymerizable adhesive into a mold; and prior to the gel point of the polymerizable adhesive, injecting polymerizable resin into the mold to impregnate the preform to form the vane after solidification, wherein the polymerizable resin is continuously injected throughout a time period during which the polymerizable adhesive reaches the gel point so that the injection of the polymerizable resin is stopped after said adhesive has reached the gel point.

11. The method according to claim 10, wherein the polymerizable adhesive is in the form of an adhesive film, and wherein the adhesive film is placed into a groove of the shield, the groove being configured to receive the edge of the perform.

12. The method according to claim 10, wherein the time period starts at least five minutes before the polymerizable adhesive reaches the gel point, and ends at least five minutes after the polymerizable adhesive reaches the gel point.

\* \* \* \* \*